(12) United States Patent
Nygård

(10) Patent No.: US 9,103,924 B2
(45) Date of Patent: Aug. 11, 2015

(54) HIGH THROUGHPUT DETECTOR ARRAY

(71) Applicant: Nygon AS, Asker (NO)

(72) Inventor: Einar Nygård, Asker (NO)

(73) Assignee: Nygon AS, Asker (NO)

( * ) Notice: Subject to any disclaimer, the term of this patent is extended or adjusted under 35 U.S.C. 154(b) by 54 days.

(21) Appl. No.: 14/053,035

(22) Filed: Oct. 14, 2013

(65) Prior Publication Data

US 2015/0102227 A1    Apr. 16, 2015

(51) Int. Cl.
*G01T 1/24* (2006.01)
*H04N 5/32* (2006.01)

(52) U.S. Cl.
CPC .................. *G01T 1/247* (2013.01); *G01T 1/246* (2013.01); *H04N 5/32* (2013.01)

(58) Field of Classification Search
CPC .................................. G01T 1/24; G01T 1/247
USPC ...................................... 250/370.09
See application file for complete search history.

(56) References Cited

U.S. PATENT DOCUMENTS 6,389,102 B2 * 5/2002 Mazor et al. ..................... 378/89
7,605,375 B2 * 10/2009 Spartiotis et al. ........ 250/370.09

* cited by examiner

*Primary Examiner* — David Porta
*Assistant Examiner* — Hugh H Maupin
(74) *Attorney, Agent, or Firm* — Leydig, Voit & Mayer

(57) ABSTRACT

A detector has a 2-dimensional matrix of pixels that includes at least one group wherein there is coupled to each pixel in the group a respective electronic circuit being responsive to a discrete photon striking the pixel for generating and storing a corresponding analog pixel level signal fed to a processing circuit via a common analog databus common. A common signaling line informs the respective electronic circuit that the databus is available, and a respective logic circuit coupled to all of the electronic circuits in the group and responsive to the signaling line being available and to the signal level of any pixel in the group being commensurate with the pixel having been hit by a photon, passes the analog pixel level on to the databus and flags the signaling line as busy so that the other pixels in the group are notified that the databus is busy.

20 Claims, 9 Drawing Sheets

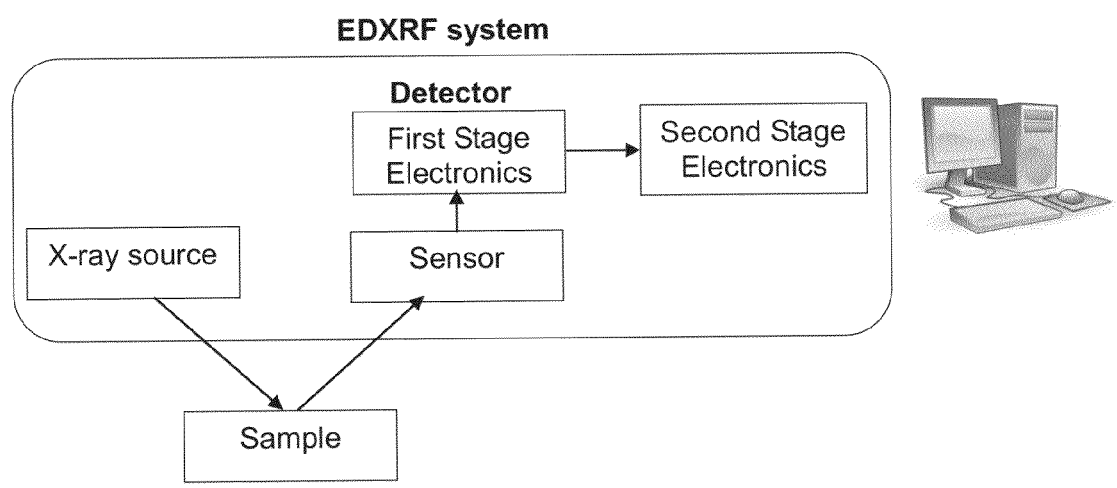
FIG. 1
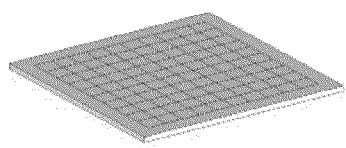
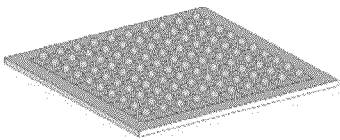
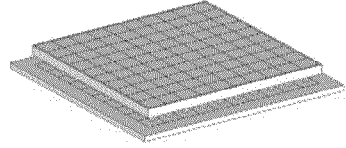
FIG. 2a       FIG. 2b      FIG. 2c

HIGH THROUGHPUT DETECTOR ARRAY

FIELD OF THE INVENTION

This invention relates to a pixel array detector for energy-dispersive X-ray or γ-ray detection, specifically to such a detector dedicated for X-ray fluorescence spectroscopy (XRF).

BACKGROUND OF THE INVENTION

Energy-dispersive X-ray spectroscopy (EDS) is X-ray spectroscopy by means of energy detection, as opposed to the different method of X-ray spectroscopy by means of wavelength detection (WDS). EDS is commonly used in electron microscopes and in X-ray fluorescence (XRF) spectrometers. In the latter case, the specific term for the method is Energy Dispersive X-Ray Fluorescence (EDXRF), i.e. XRF by means of EDS. In the following description, the EDXRF utilization is used as example, but it is to be understood that the present invention relates to the detector of the system, and this might be used generically in all EDS. The invention can also be used for other high-energy photon spectroscopy, and also even for X-ray or γ-ray imaging.

A major limiting factor in the performance of an EDS system is the detector, and two important parameters that determine the quality of a detector are the energy-resolution and the detection throughput. Detection throughput is defined herein as a parameter combining the active area coverage of the detector with the speed at which the X-rays are processed, i.e. high throughput occurs when the active area coverage is large in combination with the ability to also process the X-rays at high speed across this entire area.

Almost all EDS sensors are based on some form of a semiconductor element (diode) as the sensor, i.e. the material that converts the X-ray to an electric signal. They all operate by the same basic principle: an incoming X-ray that reacts with an atom in the sensor gives rise to an ionization process that creates an electric charge which, in the presence of an electric field, will drift to the anode of the sensor where it can be picked up by an electronic amplifier. The amount of charge produced in such event is proportional to the energy of the incoming photon.

The sensor is a crucial element in determining the quality of the X-ray detection. One of the main challenges in obtaining high energy resolution is that the sensor also needs to cover a certain large physical area in order for it to be efficient i.e. have high throughput. For some conventional sensor types in recent years, however, the energy resolution usually degrades in proportion to the active sensor area, owing to an increase in its capacitance and dark-current. For this reason, such sensors may have been cooled with cumbersome cooling systems, in order to minimize the dark-current. Today's most popular sensor type, the Silicon Drift Detector (SDD), however, solves the problem of capacitance through an asymmetry between the sensor's cathode and anode. The cathode is kept large which makes the area coverage large as well, whereas the anode is made small which creates the low capacitance. With low capacitance, the dark-current is less of a problem because its effect can be minimized by using a high bandwidth in the subsequent amplification filter. The latter comes with yet one more advantage, namely allowing for higher speed detection.

But there is one disadvantage also with the SDD, namely that all the X-ray originated signals picked up in the large cathode area need to be "squeezed through" the small area of the anode, such that one single amplifier needs to cope with the entire X-ray flux of the large detection area. So even if the throughput for the SDD is more than satisfactory in comparison with other sensors used today, it still represents a major limitation.

The most crucial parameters determining the quality of an X-ray spectrometer detector are thus:
1. The energy-resolution (limited by capacitance and dark-current), and,
2. The X-ray rate throughput capability.

The SDD is optimal only in respect to the first, whereas the invention presented herein will improve the X-ray throughput capability but not at the expense of the energy-resolution.

Usually, X-ray spectrometer detector developments are directed to obtaining as large detection coverage-area as possible while, at the same time, maintaining energy-resolution to a desired value. The current industry standard for this is typically better than ~150 eV (full width at half maximum—FWHM), and state-of-the-art SDDs can accomplish this at detection coverage-areas in the range 10-100 square mm, and with a detection-rate capability of $\sim 1 \times 10^6$ X-rays per second for that coverage area. This limitation in throughput is in part dictated by the bottleneck caused by the fact that the sensor is in effect, just one large pixel, i.e. all photons must pass through the one single anode to get to the first amplifier and onward to the downstream processing stages. This means that if two or more photons strike the sensor near simultaneously, the first amplifier will not be able to separate between the photons, and the two signals will (partly) be piled up on the back of each other and appear to be just one signal with a combined energy. To minimize such pile-up effect, the X-ray rate must be limited so that the likelihood for it to occur becomes very small. It should be noted that use of what is effectively only a single pixel is not a problem where X-ray spectrometry is concerned, since generally all that is important is the charge generated by the photon and not its location. So the fact that two photons strike the sensor at different locations simultaneously does not require their locations to be discriminated, but it does require that the equivalent energy signal corresponding to each photon be discriminated.

In such SDDs, the electric signals resulting from all the X-rays impinging across the entire coverage-area need to pass through just one single electrode, and one single electronic channel, i.e. a front-end amplifier and a subsequent downstream signal processing chain, must handle all the signals, without the possibility for parallelism. The front-end amplifier in all of these kinds of detectors must have a certain bandwidth limitation in order to obtain the required energy-resolution, and it is therefore a limit to how high a signal flux can pass through one single channel.

Therefore, considering the same detection coverage-area, it would be expected that higher rates could be obtained by fragmenting the sensor into a 2D array of smaller pixels, each having their own electrode and their own signal processing channel. For example, considering a 100 mm² detector coverage-area fragmented into 1 mm² pixels, and thus having 100 parallel signal processing channels, the potential signal-rate capability would increase by the same 100 times, which is significant. This would in theory be accomplished because smaller detector segments (pixels) will actually allow for smaller capacitance and smaller dark-current per channel, and with sufficiently small pixels it should in theory be possible to achieve the required energy-resolution without even using the silicon-drift principle i.e. even regular cubic diodes ought to suffice. The latter should also simplify the sensor structure.

While this should all be true in theory, in practice no such detector has been realized owing to the difficulties in implementation. It is to the actual realization of such a detector that the invention is directed.

Pixel Detectors

The image capture device in digital photo cameras can be said to be an array of pixel detectors although the denomination CCD or CMOS sensor is rather used. The term pixel detector is more common when detecting other photons/particles than visible light, in particular in high-energy-physics detectors. In photographic capture devices the sensing elements (diodes) are usually combined with some degree of front-end electronics inside of the pixels in the same die. When the term 'pixel detector' is used, the sensing pixels (diodes) are usually located separately on one die, whereas the corresponding front-end electronics pixels are located in a separate die. Because of the 2D matrix arrangement of the pixels, the pixel detector requires a special method in order to interconnect the sensor pixels with the front-end electronics pixels, called bump-bonding, as shown pictorially in FIG. 1.

In the following description, the term 'detector' refers to the pair of 1) a sensor (typically crystalline silicon), being the material converting the X-rays into electrical signals, and 2) the first-stage electronics which, at the very least, processes the electric signals from its very weak analog form into a suitable much stronger analog form which more conveniently can be transferred to a second-stage electronics. In its simplest form, this first-stage electronics could be just an amplifier, but in the invention there is more functionality. Also, in this invention, the first-stage electronics is represented in a single-die integrated circuit (IC).

In the definition used here, the second-stage electronics is not a part of the detector. This second-stage electronics typically contains data acquisition electronics (DAS) that converts the detector-data into digital form (A/D conversion), before conveying it to a computer for analysis, and handles detector control functions.

In the following description the notion "naked-die IC" can be used for the first-stage electronics; and the notion "DAS" for the second-stage electronics.

Thus, the pixel detector is typically a two-layered sandwich, allowing 2D dense integration of pairs of sensor-element and first-stage electronics. In FIG. 2, the X-rays enter from the top, are to an electric signal (charge) in the upper-layer sensor (confined in just one of the pixels), are transferred via the bump connection to the corresponding pixel in the lower-layer naked-die IC for the first-stage electronics processing. This sandwich corresponds to the sensor and the first stage electronics, as shown schematically in FIG. 2.

Such a configuration is shown, for example, in WO 2009/072056, which discloses a monolithically integrated crystalline direct-conversion semiconductor detector comprising an unstructured semiconductor layer having a polished surface on an anode-faced side. The opposite side is attached to an electrically conductive intermediate layer. The polished surface is contacted at ultra-fine pitch with metal bumps of a bumped. CMOS wafer given by a crystalline semiconductor layer, the metal bumps being bonded to the anode-sided surface of the semiconductor layer.

It is, however, important to distinguish between imaging detectors of the kind described in WO 2009/072056 and the type of detector shown schematically in FIG. 1 with which the present invention is concerned. Thus, a pixel detector used for capturing a photographic image is bombarded with light that is reflected from a target and focused by a lens. The light that strikes the pixels of the pixel detector includes thousands of photons and each pixel, in effect, stores an integrated charge corresponding to the total number of photons that reach the pixel during the small time interval that the camera shutter is open. The energy of any single photon is not significant and therefore the event that gives rise to each photon emission does not need to be detected.

In contrast to such a system, X-ray spectroscopy directs a source of high energy electrons from an X-ray source to a target. If the electron has enough energy it can knock an orbital electron out of the inner electron shell of an atom of the target, and as a result electrons from higher energy levels then fill up the vacancy and X-ray photons are emitted. This process produces an emission spectrum of X-rays at a few discrete wavelengths, sometimes referred to as the spectral lines that depend on the element used and thus are characteristic of the element. If the target is a composite of different elements, each element will emit spectral lines of a different characteristic wavelength.

An X-ray spectrometer does not produce an X-ray image of a target but rather analyses the different characteristic wavelengths emitted thereby, in order to identify the composition of the target. It does this by counting the number of X-ray photons emitted thereby for each characteristic wavelength, so that the relative number of X-ray photons for each characteristic wavelength provides a quantitative measure of the composition of the target. Thus, pure copper emits X-ray photons whose energy is approximately 8.05 keV while iron emits X-ray photons whose energy is approximately 6.4 keV. In an X-ray spectrometer the X-ray photons emitted by the target are scattered. Thus, unlike a conventional photographic detector where each pixel is imaged by a unique, identifiable point of the target, the X-ray photons emitted by the target in an X-ray spectrometer are scattered and cannot be mapped to any specific coordinate of the target. But the cumulative number of X-ray photons of each characteristic image provides a measure of the composition of the target. So the relative number of X-rays having energy of 8.05 keV and 6.4 keV, allows determination of the relative proportions of each element.

Thus, the pixels in the detector of an X-ray spectrometer must respond to each discrete X-ray photon that strikes it and record its energy, and the detector must keep a record of the cumulative number of X-ray photons of each characteristic energy. Each X-ray photon striking a pixel gives rise to a charge whose value is proportional to the energy of the photon, and this may easily be measured as current or voltage using suitable pixel electronics.

However, while the quantum physics that determines the characteristic energy of an X-ray photon is determinate and inviolable, being a function of the energy difference between the quantum levels of two electron orbits of the target, the X-ray energy that is actually registered by a pixel is subject to indeterminacy owing to slight differences in the charge accumulated by the pixels of the detector even when nominally they are hit by X-ray photons emitted by the same element. So, for example, the X-ray energy (Kα) of copper is 8.046 keV while that of zinc, which is the adjacent element in the next group of the Periodic Table, is 8.637 keV, a difference of nearly 6%. As atomic number increases, the relative difference in X-ray energy between adjacent elements in the same row of the Periodic Table decreases. Thus, the X-ray energies of tin (Si) and antimony (Sb) are 25.271 and 26.359 keV, respectively, i.e. a difference of only 4.305%. Such a difference may well be smaller than the manufacturing tolerance of the components used in the pixel electronics, which might therefore register an X-ray photon as having been emitted by the wrong element and allocate the photon count to an incorrect bin.

This requires that each pixel in the detector be calibrated so that any slight differences in the relative sensitivities of pixels and their associated electronics may be nullified, thereby producing consistent normalized responses for every pixel in the sensor array.

SUMMARY OF THE INVENTION

It is an object of the invention to provide a detector and method of use thereof where photon events are processed at the sensor level using analog signals.

This object is realized in accordance with one aspect of the invention by a detector having a 2-dimensional matrix of pixels for accumulating data relating to discrete photons striking pixels in said matrix, said matrix including at least one group of pixels and further comprising for each group:

a respective electronic circuit coupled to each pixel in the group, each electronic circuit being responsive to a discrete photon striking the pixel for generating and storing an analog pixel level signal whose value is a function of energy of the photon, an analog databus that is common to all pixels in the group and which feeds said analog signals to a processing circuit for processing the analog signals, a common signaling line coupled to all pixels in the group for conveying to the respective electronic circuit a signal indicating that the databus is available to convey pixel data, and a respective logic circuit coupled to all of the electronic circuits in the group and being responsive to the signaling line being available and to the analog pixel level of any pixel in the group having an amplitude indicative of the pixel having been hit by a photon, for passing said analog pixel level on to the databus and flagging the signaling line as busy so that the other pixels in the group are notified that the databus is busy.

The principle of operation of the invention is that during the time that it takes for the pixel electronics to generate and store the analog signal level corresponding to the energy of an incident photon, the analog data bus is able to convey any waiting analog signals corresponding to earlier photons striking other pixels so that no pixel electronics will have to wait very long become the databus becomes available to convey its stored data.

Such an arrangement will allow all photon events associated with any given pixel to be captured provided that the analog databus has a sufficiently high throughput that the respective analog signal level generated by the pixel may be conveyed to the processing circuit in the second stage before a subsequent photon strikes the same pixel. Obviously photons strike the sensor randomly and there is no way to predict the time delay between successive photons striking the same pixel, but the faster the analog signal levels are conveyed through the databus, the less likely it is that a subsequent photon will strike the same pixel before its stored data has been conveyed to the processing circuit.

However, it is to be noted that in practice little, if any, harm will ensue if occasional photon events are lost provided that statistically such loss is rare. Likewise, white it is obviously undesirable that two active pixels will compete for the databus at the same time, again provided that the analog databus has a sufficiently high throughput, the probability that this will occur may be minimized to the extent that it may safely be ignored.

One skilled in the art will appreciate that in practice an analog databus may be capable of conveying a signal in less than 100 ns. The time taken for a photon to strike a pixel and for the pixel electronics to generate and store the energy signal may typically be in the order of 1 µs. So if there are 10 pixels in the group, then at least statistically if a photon strikes all pixels in the group at a rate of 10 photons/µs, the analog databus should on average be capable of handling alt the data. In practice, of course, this may not quite hold true since it assumes that the stored data for each pixel is transmitted to the analog databus before another photon strikes the same pixel. If this does not occur, the data pertaining to the later photon will, of course, be lost. But this is also true in known sensors, as discussed above albeit for different reasons. The smaller the number of pixels coupled to the analog databus, the lower is the probability that two pixels will become active before the data pertaining to one of the pixels is conveyed through the analog databus. More specifically, the probability depends on the actual speed of the analog databus, the number of pixels using the databus and the average photon input flux rate (which determines the number of photons received per pixel per unit time). These are measurable parameters that allow the practical limit of the circuitry to be determined. If it is determined that the limit is likely to be reached, then the sensor area can be divided into parallel groups of pixels, each of whose pixels have their own databus. This reduces the probability that two or more pixels in the same group will be active simultaneously, while allowing for the capture of signals from two or more simultaneously active pixels in different groups.

As mentioned above, the most crucial parameters determining the quality of an X-ray spectrometer detector are: 1) the energy-resolution, and, 2) the X-ray rate throughput capability.

The underlying idea in how to accomplish this may be summarized as follows:

1. Keep the capacitance and dark-current small by making an individual sensor pixel as small in area as necessary (sensor-pixels).
2. Keep the overall sensor area large by monolithically integrating several sensor-pixels side by side into a 2D array (matrix) of such pixels.
3. Add electronic amplifiers and subsequent (first stage) electronics to each sensor-pixel.
4. Provide architecture and methods in this first stage electronics that allow for individual processing and transmission of the data of each pixel, in parallel to all the other pixels.

Each sensor-pixel could also in this case use the drift-principle of the SDD, but the above concept will allow for sufficiently small pixels to make the need for use of the drift-principle unnecessary.

While the fabrication of a pixel detector sandwich is known per se, the invention uses this concept in combination with a novel architecture and methods in the first stage electronics that facilitate individual processing and transmission of the data of each pixel, in parallel to all the other pixels. Hence, the invention resides principally in the electronic architecture.

The known pixel detector sandwich architecture solves the problem of how to interconnect a 2D matrix of sensor-elements with a corresponding 2D matrix of first-stage electronics, and hence how to get the data in. But this still leaves the problem of how to get the data out in a practical manner and at full parallelism. If the data were digitized (A/D converted) inside of each pixel, it is conceivable that full parallelism could be achieved quite straightforwardly, but this would not be practical due to space and power consumption constraints, and also next to impossible due to the noise that such digital activity would cause to the very sensitive inputs.

The invention overcomes this problem by processing the data in analog form only at this first-stage electronics level by creating analog data-packets and transmitting these to the second-stage electronics level (i.e. the data acquisition electronics including the A/D conversion).

Data-Flow Wise Presentation to the Solution

The architecture according to the invention is data-driven and asynchronous (i.e. without synchronized system clocking), and the principle of how to facilitate this, by each pixel in the first-stage electronics level, is shown in the data-flow chart of FIG. 4.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 is a schematic representation of a conventional energy-dispersive X-ray spectroscopy (EDS) system;

FIGS. 2a to 2c show pictorially subsequent stages in assembly of a conventional pixel detector;

DETAILED DESCRIPTION OF EMBODIMENTS

First Stage Pixel Electronics—Simplified Architecture

Figure 3:
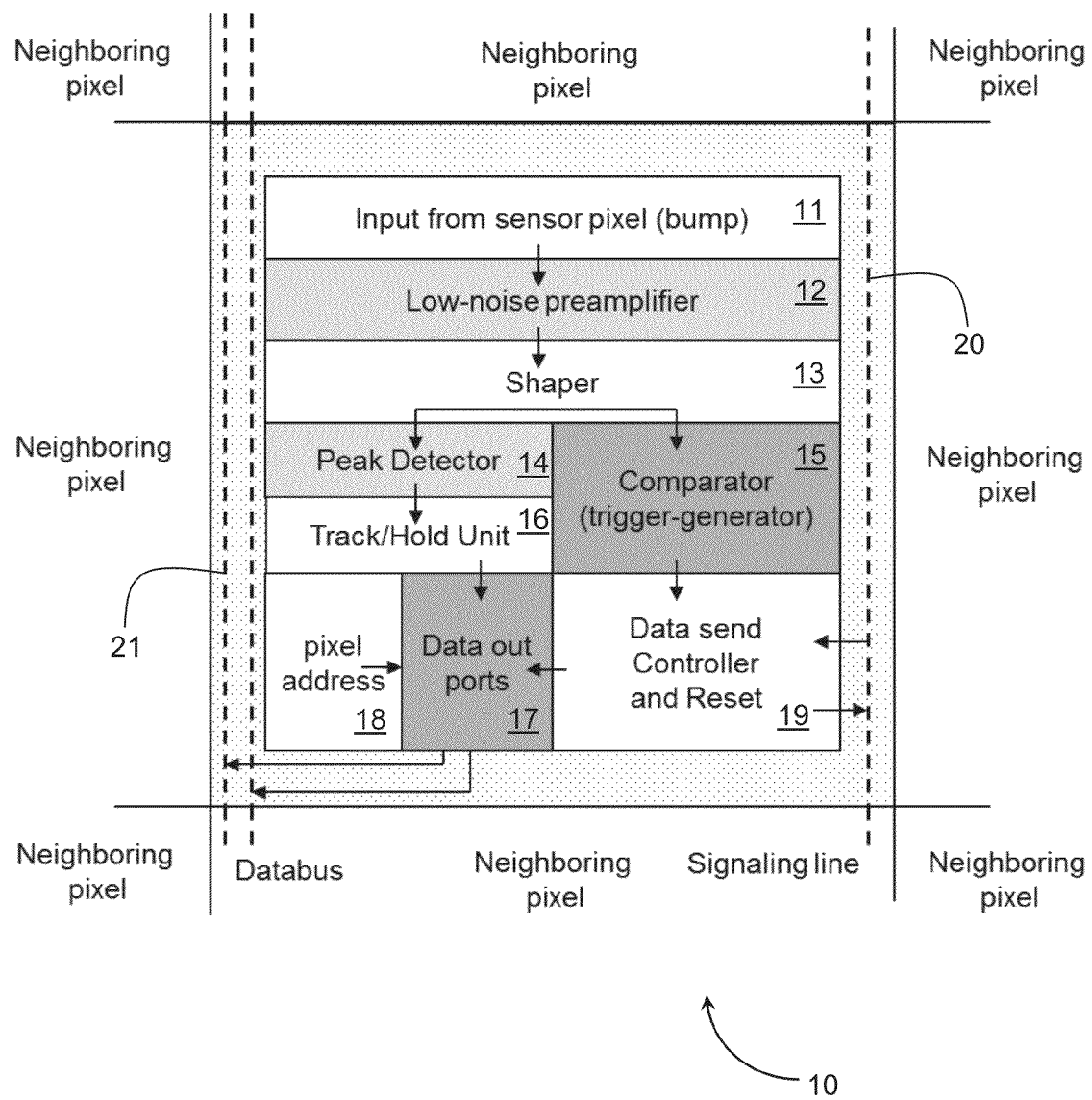
FIG. 3 shows schematically the architecture of a single pixel in the pixel detector according to the invention.

FIG. 3 is a block diagram showing the functionality of a circuit 10, which constitutes the front-end electronics in a pixel detector according to an embodiment the invention. The circuit 10 is repeated for every single pixel in the sensor. As noted previously, the sensor typically comprises a layer of sensor elements (pixels), each of which is bump-bonded to an input 11 of the circuit shown in FIG. 3 via a bump. A low noise pre-amplifier 12 is coupled to the input 11, an output being coupled to a shaper 13 in known manner. The shaped analog signal produced by the shaper 13 is fed to both a peak detector 14 and a discriminator 15 that operates as a trigger-generator, as explained in more detail below with reference to FIG. 4. The peak detector 14 stretches the analog signal so as to follow the signal during its rise time and then remain at its peak value, so as to allow the peak value to be held by a track hold device 16. The output of the discriminator 15 corresponding to the analog signal level of the pixel is fed to a data output port 17 together with a unique analog signal indicative of an address of the pixel and which is stored in an address buffer 18. A data send controller 19 is coupled to the output port 17 and is responsive to a signal generated by a signaling line 20 for transferring the data in the output port 17 to an analog databus 21. The analog databus 21 is a dual databus output, one analog bus for the signal amplitude transfer and one analog bus for the pixel address. In addition to these inputs and outputs the only other signal the pixel interacts with is the signaling line 20. It should be noted that the signaling line 20 need not be limited to just one physical single line; it could also be e.g. a differential pair signaling line. The notion 'bus', as in the terms 'analog bus' and 'pixel address bus', denotes that they are buses because they time-multiplex data. Physically, they are typically single or differential pair lines.

First Stage Pixel Electronics—Functionality

Figure 4:
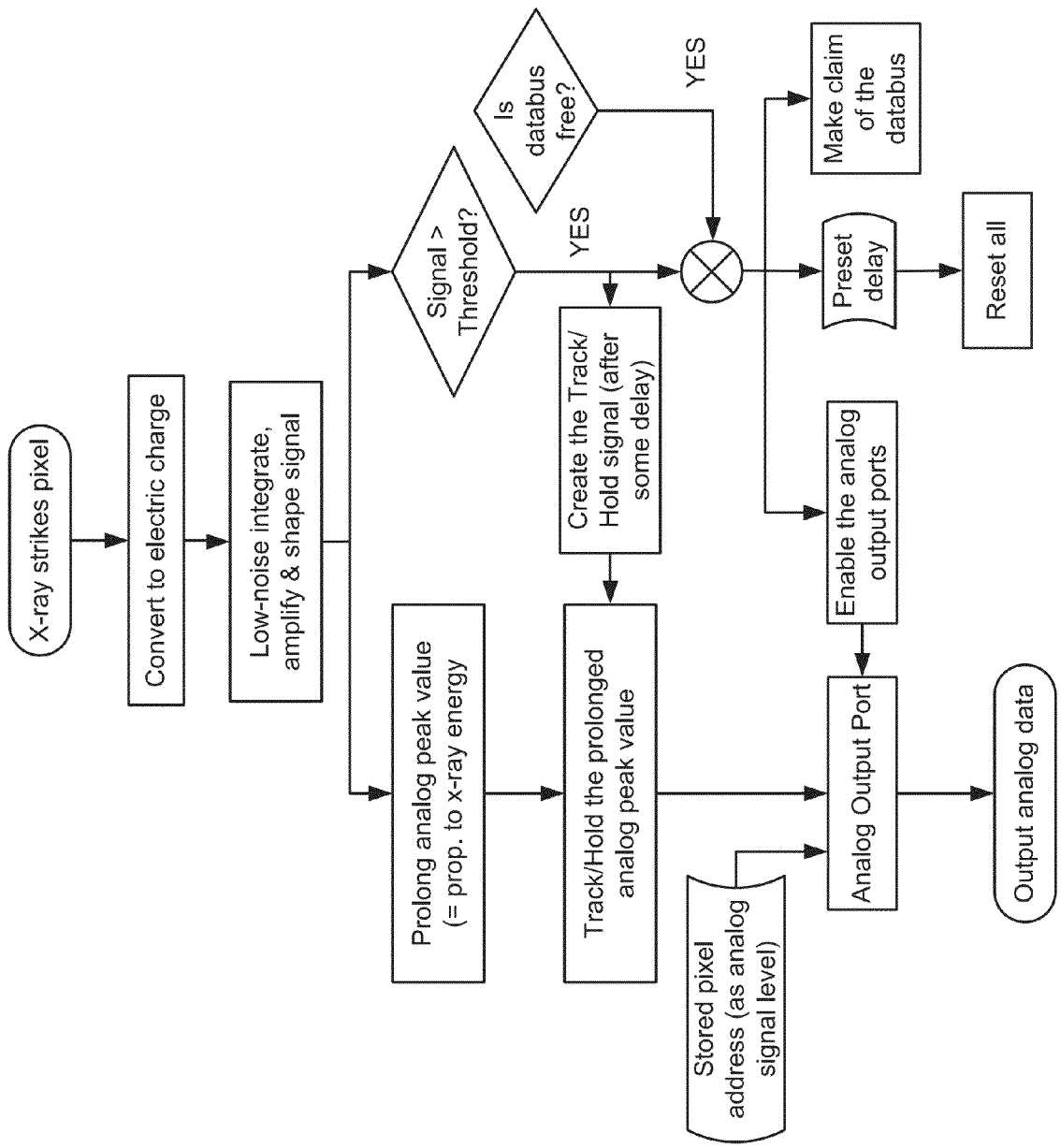
FIG. 4 is a flow diagram showing functional data flow architecture of the front-end pixel electronics in a pixel detector according to the invention.

FIG. 4 is a flow diagram showing functional data flow architecture of the circuit 10. Each circuit 10 receives charge from its corresponding sensor-pixel whenever an X-ray hits the sensor-pixel. The charge from sensor-pixel is integrated by the low-noise charge-sensitive pre-amplifier 12, after which the integrated signal is further amplified and filtered (shaped) by the shaper 13. The signal at this point is an analog voltage, shaped into a semi-Gaussian looking pulse. The peak-value of this pulse will be proportional to the energy of the causing X-ray and is extracted by a stretcher or a peak-detector 14. In a parallel branch, the amplitude of the pulse from the shaper 13 is simultaneously also compared to a preset threshold by the discriminator/comparator 16. If the signal reaches above this threshold it is deemed eligible to be acquired (i.e. to be transmitted to the second-stage electronics). In this case, a track and hold signal is generated after a short delay and the peak-value extracted by the peak-detector 14 is tracked and held by a track hold unit 16 that is triggered by the track and hold signal. The signal amplitude is thus now stored in the output port 17 as DC-voltage level and is ready to be transmitted. This data will later be transmitted as an analog "data-packet", but at the overall system level it is necessary to also know which pixel is the sender of this data-package. This is required for the purpose of calibration/data-correction in order to ensure consistent normalized responses for every pixel in the sensor array as explained above. This feature enables the detector to be used also for X-ray/gamma imaging. Therefore, a unique pre-programmed pixel address 18 is stored inside of each pixel and, for practical and performance reasons, the address is also represented by an analog voltage level (i.e. a unique voltage level that can identify the pixel). Thus, the overall data-packet will consist of two analog level values: one which contains the peak value of the shaped signal, and one which contains the pixel address. However, there is a 2D matrix of pixels in this first-stage electronics (IC) and it is necessary to share between the pixels the read-out databus as it would be, if not impossible, then at least very impractical to allow for each pixel to have its own individual databus between itself and the second-stage electronics. A data send controller 19 is responsive to a signal conveyed by a signaling line 20 for conveying both the analog pixel value and the address signals to an analog databus 21.

All of the pixels in the first-stage electronics can be just one group or "sharing community" so that there will be just one single shared databus 21 between the first and the second-stage electronics. But, they can equally well be arranged as multiple groups or "sharing communities", operating independently in parallel, implying that the number of shared databuses will be more than one and equal to the number of groups or "sharing communities". One example is to arrange all the columns in the 2D matrix into one "sharing community". Another might be to arrange all the rows in the 2D matrix into one "sharing community".

To handle the sharing of the databus, the signaling line 20 is common to all pixels in a given group and runs between all the pixels in the group and with which all the pixels communicate. If there is just one "sharing community", the signaling line 20 will be global to all the pixels in the first-stage electronics, whereas if there is more than one "sharing community" each common signaling line 20 will be local to a single "sharing community" or group. The signaling line communication and control is handled by the data send controller 19 logic elements whose functionality will now be described. The data send controller 19 (constituting a logic circuit) checks whether the databus is free. If the discriminator/comparator 5 indicates that a valid pulse emanated from this pixel corresponding to its being hit by a photon, the pixel will be on stand-by and waiting on a "yes" also from a logic element in the data send controller 19 whose task is to listen to the signaling line for it to signal that the databus is free and available. Upon this second "yes", the data send controller 19 will set the signaling line into a "busy" state so that the other pixels in the sharing community are notified that this pixel is using the databus. So, the data send controller 19 effectively locks the databus in respect of other pixels. Simultaneously, the data send controller 19 will enable the output port 17 in order to let the analog data on to the databus 21. A delay-timer inside the data send controller 19 is also triggered at the moment that the output port 17 is enabled and, after a preset time, enables a full reset of the entire pixel, whereupon the transfer of the analog data-packet is completed. The total time during which the data is present on the databus 21 is thus equal to the preset delay-time, and the data send controller 19 now releases the signaling line, thus allowing for other pixels in that sharing community to now use the databus 21.

The Full First Stage Pixel Architecture

Figure 5:
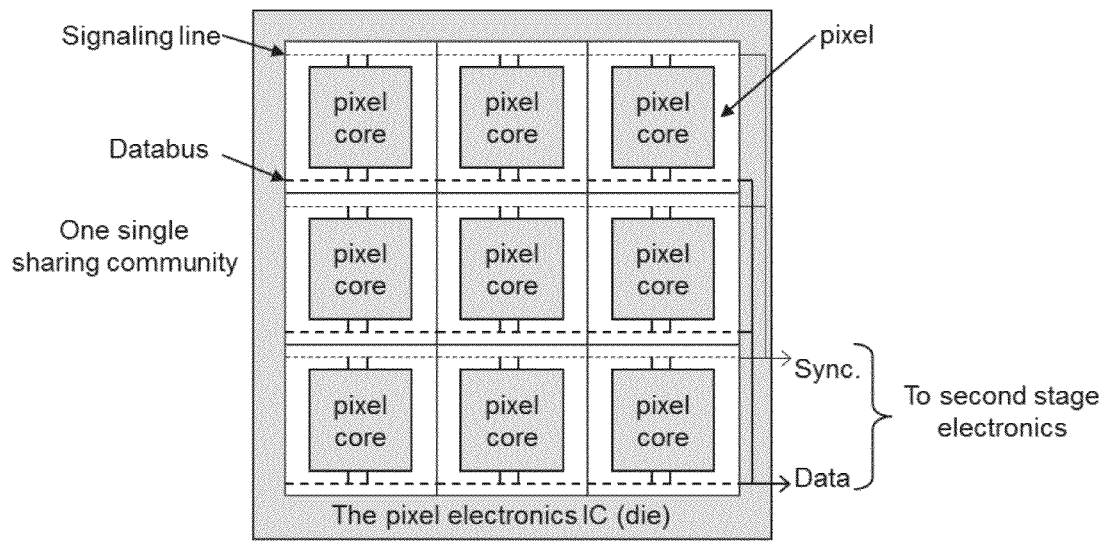
FIG. 5 shows schematically the architecture of multiple pixels whose signaling lines share a common analog bus so as to form a single sharing community of pixels.

FIG. 5 shows a simplified example of a full first stage electronics denoting physical layout on the die. The first stage electronics is an IC having for each pixel an input that is bump bonded to the pixel in the sensor array. To this end, it may be referred to as a pixel IC. This example shows a 3 by 3 pixel matrix although it could be any number of pixels in x and y, and typically more than in this example. The part of the pixel that holds all of the local electronics functions is denominated "pixel core". Across all of the pixels in each row are also shown the signaling line (above the pixel core) and the databus (below the pixel core).

FIG. 5 depicts a first-stage electronics system with a single sharing community, meaning that the signaling lines from all the rows are merged into one overall net, and, the databuses correspondingly, so that all 9 pixels share the signaling line and the databuses. The signaling line and the databuses are then sent off to the second-stage electronics, typically via a buffer.

Figure 6:
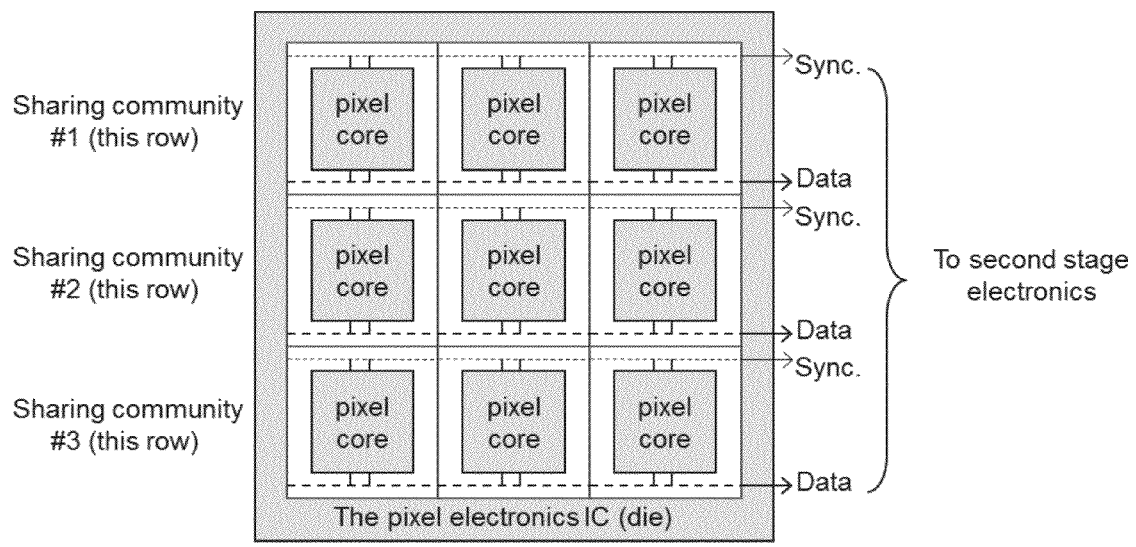
FIG. 6 shows schematically the architecture of multiple pixels arranged in groups each of whose signaling lines share a common analog bus so as to form multiple sharing communities of pixels.

FIG. 6 depicts a first-stage electronics system with several sharing communities (multi-sharing). In this example, each row is a sharing community, and only each row of 3 pixels share one signaling line and a databus that are sent off to the second-stage electronics. The arrangement and number of the sharing communities is a question of design choice, but in the case of more than one sharing community, typical arrangements would be by columns or rows.

A multi-sharing community allows for more parallelism than a single sharing community and hence higher data-transfer capability, but it will at the same time make the second-stage electronics more complex. The signaling line is always paired with the databus i.e. there will also be as many signaling lines as there will be databases and sharing communities. The signaling line also follows the databus to the second-stage electronics and is used as a data-synchronization strobe.

The Read-Out and Second-Stage Electronics

The X-rays impinging on the sensor are by nature non-synchronized (asynchronous) events and therefore also the pixel-electronics activity is time-random, as is the data transport between the first- and the second-stage electronics. The latter could possibly be time-synchronized if there were a system clock on the first stage electronics, but the extreme low-noise requirements probably militate against this. As high throughput is a main foundation of this invention, it brings very high speed requirement for this data transport, and the output data from the first stage electronics consequently "suffer" from high-rates, being in analog form and being asynchronous. Moreover, the respective databus for each sharing community is also shared between several pixels. In addition, most commercial high-speed analog-to-digital converters (ADCs) depend on synchronous (clocked) input data.

Figure 7:
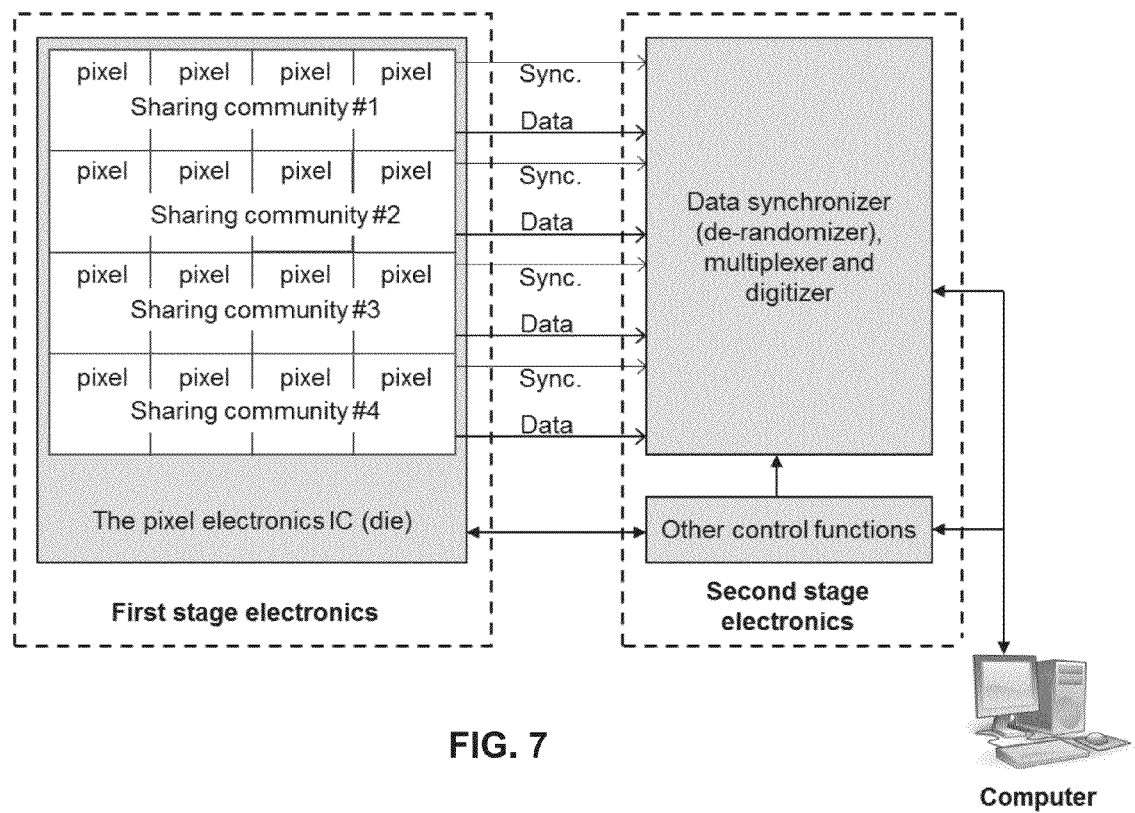
FIG. 7 shows schematically a detail of the architecture depicted in FIG. 6.
Figure 8:
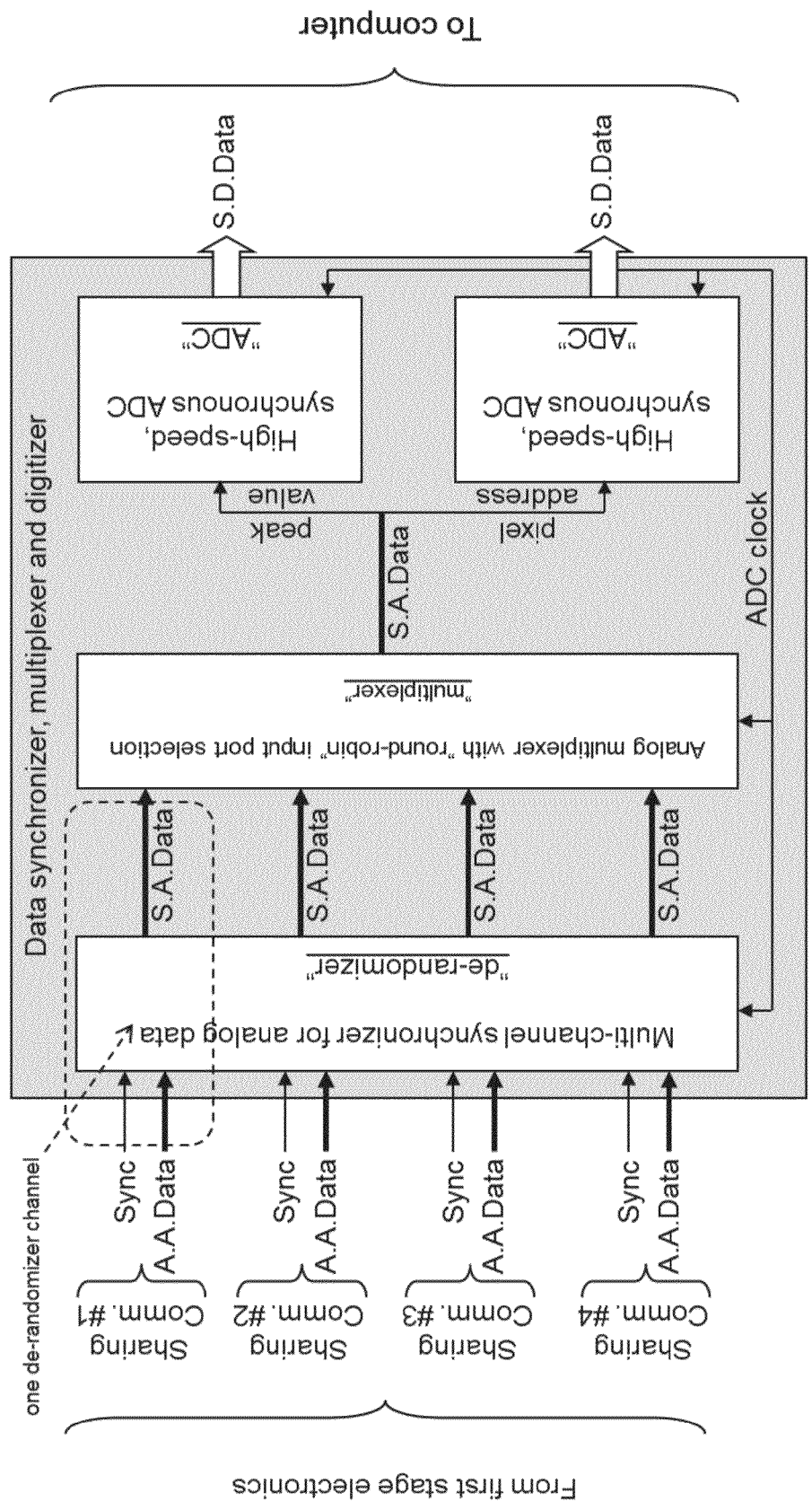
FIG. 8 shows schematically a further detail of the architecture depicted in FIG. 6.

In order to handle all of the above, new ideas are required also for the second stage electronics. To this end, FIG. 7 shows a detector layout where the sharing communities in the first stage electronics are arranged in rows, as example only. In FIG. 8 further details of the "data synchronizer, multiplexer and digitizer" unit (of the second stage electronics) are outlined.

In this example, consider analog data packets arriving from the first stage electronics e.g. sharing community #2, to the corresponding channel of the "de-randomizer" of the second stage electronics shown in FIG. 8.

There are several ways of conducting synchronization (de-randomizing) of analog data-packets. In this example, the Sync line signaling line) is initially controlled by the pixel that outputs its data. This line is, however, a wire- or/pull-down type of hand-shake line and it can therefore also be influenced by the receiving end, i.e. the de-randomizer channel. So, the pixel will push its data packet out within a preset fixed duration, but the de-randomizer channel can receive and store (track&hold) this data while also holding the Sync line in a busy state until this data, now locally stored in the de-randomizer channel, is synchronized with the ADC clock. This will prevent other pixels in the same sharing community from sending new data during this time. Such possible events will then rather be kept locally stored/buffered in the corresponding pixel until the de-randomizer channel has released the Sync line (meaning that this channel is now ready again to receive more data). It is the in-built nature of buffering capability in the pixel-electronics that allows such simple data synchronization. An alternative way is to provide a pipeline kind of buffer in each de-randomizer channel to perform the synchronization. This would make the Sync line hand-shake unnecessary, although such an approach would probably be unnecessarily more complicated.

The (analog) multiplexer that follows the de-randomizer is also sectioned into channels, each of them in cascade with a corresponding sharing community number and the corresponding de-randomizing channel. The inputs of the channels in this multiplexer are enabled one after another with the enable period in synchronization with, and with the duration of the clock of the following ADC(s). After the enable is completed for the input of the last channel (channel 4 in this example), it will immediately start again to enable the input of the first channel (which makes the commonly used "round-robin" name appropriate). The following ADC(s) will consequently digitize one channel after the other, and start over again when the last channel is completed. Upon completion of one multiplexer channel, the corresponding de-randomizer channel will get a reset, so that its input can be ready to receive a new packet of data from the corresponding sharing community in the first stage electronics. One result of this reset is that the corresponding Sync line will be released which allows the sharing community to know that it is now possible to "push out" the next packet of data. Depending on the X-ray rate it is quite likely that there will not always be any data in a given de-randomizer/multiplexer channel, and the input-level of the multiplexer in those cased needs to be a well-defined out-of-signal-range value. The ADC(s) will therefore, in those cases, digitize this out-of-signal-range value, which in the downstream data analysis will simply mean "no data" and hence simply ignored when building the X-ray spectrum.

As mentioned, the data that passes through the channels of the "data synchronizer, multiplexer and digitizer" unit of the second stage electronics, is a double set: one representing the peak value of the X-ray, and one representing the pixel number. Consequently two ADCs are required to handle both.

By way of example, all 100 pixels in a detector having a 2-dimensional 10×10 pixel array divided into 10 sharing communities (groups) can be handled by a single off-the-shelf 100 MHz ADC that requires only 10 ns per analog-digital conversion, using a 10-channel de-randomizer with a 10-channel multiplexer.

Figure 9A:
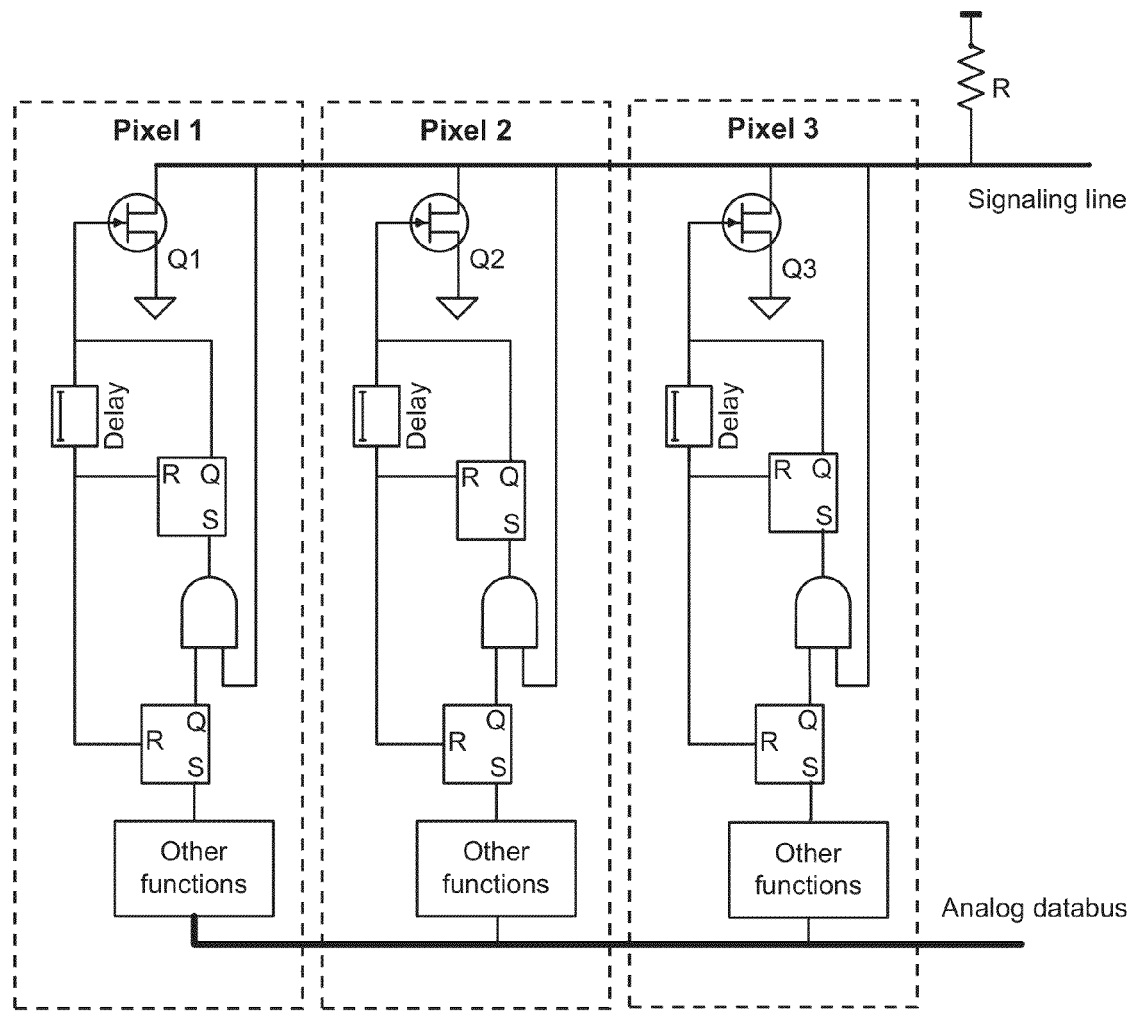
FIGS. 9a and 9b are partial schematic circuit diagrams showing details of a de-randomizer channel.
Figure 9B:
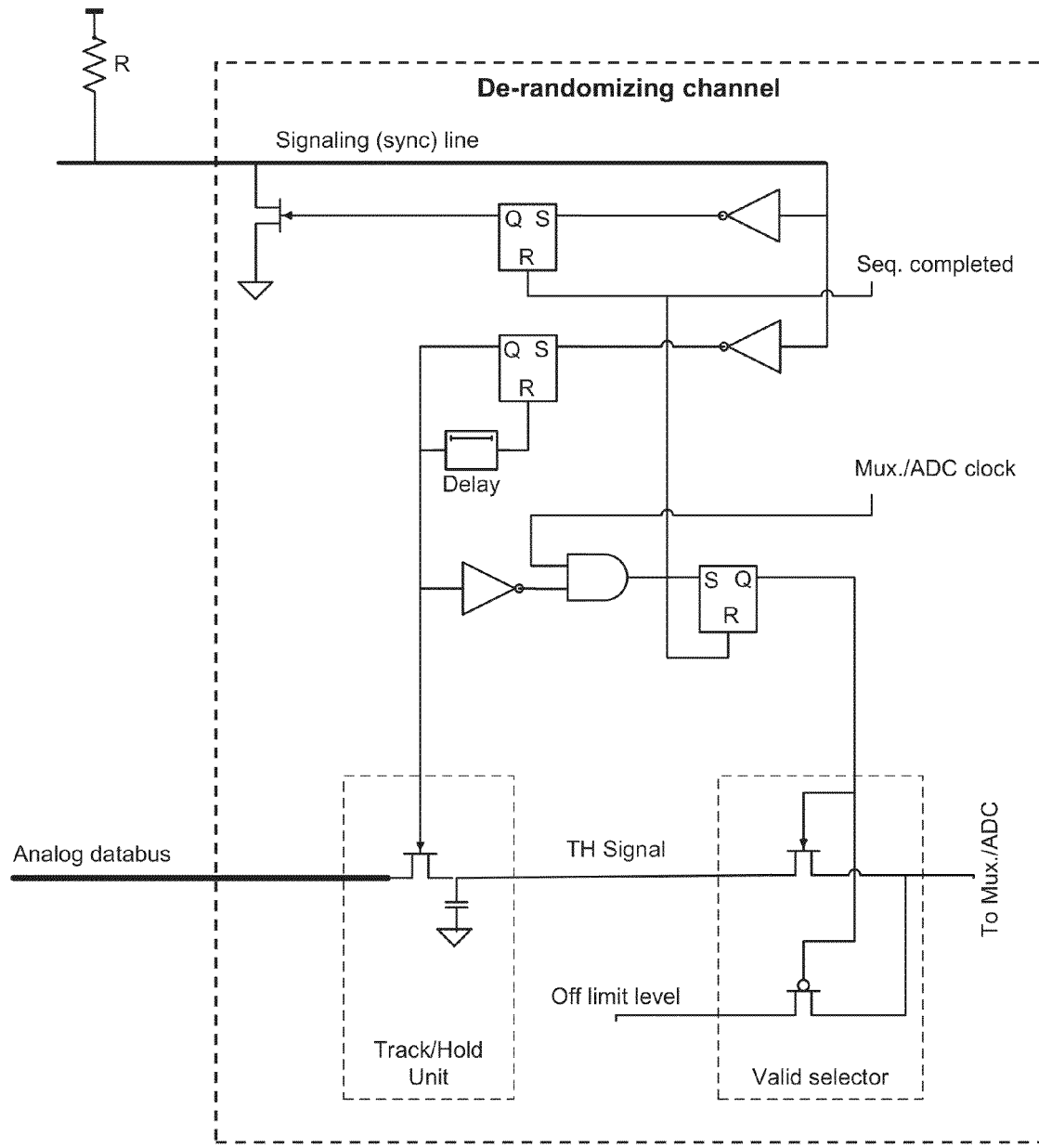

FIGS. 9a and 9b shows one example of how to implement the de-randomizing (synchronization) of the data-packets on the databus.

FIG. 9a shows schematically partial functionality of 3 pixels in a group (sharing community) showing the signaling-line logic including the signaling line pull-down transistors Q1, Q2 and Q3. Attached to the signaling-line is also shown a pull-up resistor, R that will keep the level of the signaling-line "high" if no pull-down transistors Q1, Q2 and Q3 are active. This "high" level signals that the databus is "free" whereas a "low" level consequently signals that the databus is "busy".

FIG. 9b shows schematically partial functionality of a de-randomizing channel. One such channel is dedicated to service one pixel group. The purpose of this de-randomizing channel is to synchronize the time-random analog data-packets transferring on the databus with the synchronized clock of the multiplexer that follows after the de-randomizer (or, just the clock of the ADC itself if there is no multiplexer).

It should be noted that a multi-group system can be without the multiplexer, and separate ADC's instead can be placed for each group in parallel. This could allow for an even faster system and thus might be preferred.

Figure 10:
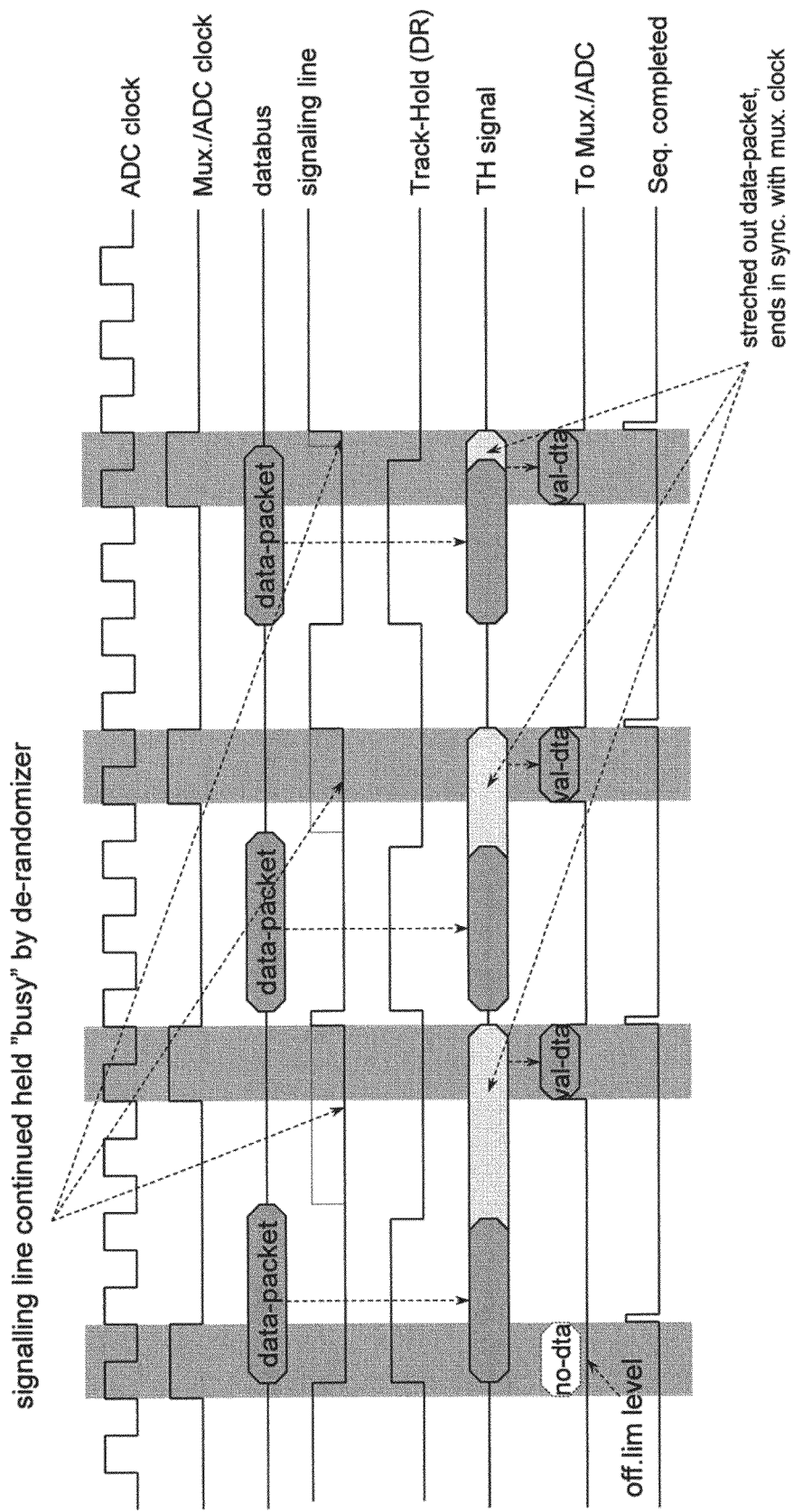
FIG. 10 is a timing diagram showing operation of the de-randomizer channel shown in FIGS. 9a and 9b.

FIG. 10 shows an example of timing in the case of three consecutive data-packets being transmitted. One of the three exemplified pixels has become triggered by an X-ray signal and when the signaling line entering on the right hand side input of the AND-gate in the pixels (shown in FIG. 9a) is "high" meaning that the databus is free, this trigger will turn on the corresponding pull-down transistor, which in turn will pull down the signaling line (to make it signal "busy"). Simultaneously, the data-packet of the same pixel will start to transmit on the databus. The starting of this triggered process is time-random and not in sync with the multiplexer/ADC clock.

What happens next is that the de-randomizer channel will respond to the "free" to "busy" toggle of the signaling line and will first set its own pull-down transistor, shown as Q4 in FIG. 9b. Momentarily this will not affect the logic state of the signaling line because it is already pulled down by the data-transferring pixel. Next, the de-randomizer will set the Track-Hold (DR) signal "high" so that the track/hold unit is set in tracking mode i.e. so that it opens for the data-packet on the databus. The delay-unit shown in the pixels (FIG. 9a) will cause the triggered pull-down transistor e.g. Q1 to self-reset to "off" state (no pull-down state) after a preset time equal to the duration of the delay. When this happens, the data-packet will also disappear on the databus. The delay-unit in the de-randomizer does a similar kind of self-reset of the Track/Hold (DR) signal but this delay is set to be somewhat shorter than the delay in the pixel. Since these two delay-units will start approximately simultaneously, the Track-Hold (DR) signal will consequently reset a little before the data-packet disappears from the databus. The reset of the Track-Hold (DR) signal implies that the track/hold unit goes into hold state, and the data-packet consequently gets stored (as the TH signal) before the data-packet disappears on the databus. When the pixel self-resets, shortly after the Track-Hold (DR) reset, is when the data-packet disappears, this being at the same time as the pull-down transistor of the pixel also is switched off. The latter could have caused the signaling line to instantly return to the "free" state. But, the de-randomizer may not yet be ready to receive another data-packet (which could have been sent immediately after) because it needs to wait until the TH signals have been properly synchronized and transferred onward to the multiplexer/ADC. For this reason, the signaling-line is kept in "busy" state by the de-randomizer pull-down transistor Q4 which continues to prevent other pixels from starting to transfer their possible already ready data.

As can be concluded from FIG. 10 in this example a multiplexer is used in front of the ADC, and the input channel that corresponds to the de-randomizing channel in this example is active in every fourth ADC clock cycle, indicating that there are three other independent inputs to this multiplexer. As also illustrated, the TH signal becomes a "stretched out" version of the data-packets: it starts at the same time (which is time random), but it will end in synchronization with the (in this example, falling) edge of the Mux. clock.

To prepare the data properly fir the multiplexer, the "valid selector" block as shown in FIG. 9a can be used. Controlled by the data valid signal it will only pass on the data-packet (TH signal) each time that Track-Hold (DR) has been activated, and, when the Mux./ADC clock signal is present. In the periods when it is not passing the TH signal through, it will instead pass through a signal (off. lim level in FIG. 10) which is out of range of any data-packet signal level. Consequently, when there are Mux./ADC clock phases in where there is no data transmitted from the pixels, the multiplexer and/or the ADC will receive an out of range signal at its or their input. This signal will also be converted by the ADC, but can easily be removed in the data analysis owing to its value being out of range.

At this point in time the TH signal (data-packet) will have been properly sampled by the multiplexer and/or the ADC, now allowing for a reset of the de-randomizing channel (by the Seq. completed signal). This reset will also reset the pull-down transistor and the signaling line will now be freed, allowing for the next pixel to convey its stored data nearly instantly, as exemplified in FIG. 10 by the near immediate occurrence of the second data-packet.

The above description is intended to render the application fully enabling with regard to the de-randomizer shown functionally in FIG. 7, since it is an important part of the processing electronics. It will be understood that this description is but one example of an implementation of the de-randomizing and there are other ways of implementing it. Also, when address data is also conveyed, the databus will typically be two buses, and they may be differential-type and may even be current-rather than voltage-type of signals in terms of the physical implementation. Likewise, the signaling line may have a different physical implementation. Typically, the detector constituted by the sensor array and first-stage electronics is integrated into a detector system together with the de-randomizer. The invention thus embraces the detector as defined above as well as such an integrated detector system. Such an integrated detector system most typically will include the ADCs as pan of the processing circuit, but it is feasible that the detector system will be completely analog and will feed de-randomized analog signals to a separate unit containing the ADCs for digitization and subsequent digital processing.

Although in the described embodiment the calibration of each pixel in the detector and normalization of the pixel data are performed by the processing unit thus requiring the address of each pixel to be conveyed thereto, the invention contemplates hardware tuning of each pixel in the sensor so that all pixels have an identical response for each photon energy. When used for X-ray spectroscopy, which is required to output only a cumulative number of photons of known X-ray energy and does not need to deter nine the X-ray energy associated with any specific pixel, this obviates the need to generate and store a second analog signal denoting the address of each pixel.

Although the invention has been described with particular regard to X-ray spectroscopy, it should nevertheless be noted that when configured to convey an address of the pixel together with the analog signal level, the detector according to the invention may be used to image X-rays striking individual pixels. Thus, normally the physical pixel position of an X-ray striking any given pixel is not itself significant, all that is important being the cumulative energy distributions, of all pixels as if they were one, that allow the composition of the target material to be determined. But it is also possible to use the detector to derive spectrograms for each pixel, since the address data may be used not only to calibrate and subsequently normalize the detected energy of the X-ray photon but also to map the energy to a specific pixel. This allows not only the overall composition to be analyzed but also to determine where each element of the target material is located.

Likewise, although the detector has been described with regard to a two-layer structure wherein the sensor layer comprises a two-dimensional matrix of pixels, each of which is coupled to a respective electronic circuit on a separate layer via a bump, the principles of the invention do not preclude the possibility that each pixel and its electronic circuit are a uniform structure formed in a unitary layer.

The invention claimed is:

1. A detector having a 2-dimensional matrix of pixels for detecting and measuring energy of individual photons striking pixels in said matrix, said matrix including at least one group of pixels and further comprising for each group:
    a respective electronic circuit coupled to each pixel in the group, each electronic circuit being responsive to an individual photon striking the pixel for generating in respect of each of said photons a respective local trigger and for generating and storing in respect of each of said photons a respective analog signal level of the pixel whose value is a function of an energy of the respective photon,
    an analog databus that is common to all pixels in the group and which feeds each of said analog signals on a per-individual-photon basis to an external processing circuit for processing the analog signals,
    a common signaling line coupled to all pixels in the group for conveying to the respective electronic circuit a signal indicating that the databus is available to convey the respective analog signal level of the corresponding pixel, and
    each of the electronic circuits in the group including logic responsive to the local trigger and to the signaling line being available, for indicating to the other electronic circuits in the group that the databus is unavailable; and
    each of the electronic circuits including a respective timer that is configured to set a preset duration for usage of the databus to feed the analog signal level to the external processing circuit and for thereafter freeing the signaling line and resetting the respective electronic circuit.

2. The detector according to claim 1, comprising a two-layer structure wherein the two-dimensional matrix of pixels is formed in a first layer and the electronic circuits are formed in a second layer separate from the first layer and each bump-bonded to the respective pixel in the first layer.

3. The detector according to claim 1, wherein there is associated with each pixel in the group a respective analog pixel address signal that uniquely identifies the pixel and the logic circuit is configured to convey the pixel address signal along the databus together with the pixel level signal.

4. The detector according to claim 1, wherein each electronic circuit comprises:
    a pre-amplifier and shaper for producing an analog voltage pulse,
    a peak-detector coupled to the shaper for extracting a peak value of the analog voltage pulse,
    a comparator for comparing the peak value to a preset threshold and generating a sample and hold signal if the peak value exceeds the threshold thereby indicating that the pulse is eligible to be acquired,
    a track and hold circuit coupled and responsive to the track and hold signal for storing in respect of said pixel an analog signal amplitude of said peak value and an address of the pixel, and
    a reset circuit for enabling a full reset of the respective pixel when transfer of the analog pixel data is completed and for releasing the signaling line, thus allowing for other pixels in the group to use the databus.

5. The detector according to claim 1, wherein each group includes pixels in a single row of the matrix.

6. The detector according to claim 1, wherein each group includes pixels in a single column of the matrix.

7. The detector according to claim 1, wherein the processing circuit includes a synchronous circuit and the electronic circuits are coupled to the synchronous circuit via a de-randomizing circuit that synchronizes pixel data fed randomly to the databus to the synchronous circuit.

8. The detector according to claim 7, wherein the synchronous circuit includes an analog-to-digital converter (ADC) controlled by a ADC clock and the de-randomizing circuit includes a respective de-randomizer channel for each group that retains the analog pixel data on the respective analog databus for sufficient time to enable its peak value to be converted to a digital signal by the ADC for subsequent digital processing.

9. The detector according to claim 8, wherein each pixel pushes its respective pixel data out within a preset fixed duration while flagging the respective signaling line as busy, and the de-randomizer channel is configured to receive and store the pixel data while also holding the signaling line in a busy state until the pixel data, now locally stored in the de-randomizer channel, is synchronized with the ADC clock.

10. The detector according to claim 8, wherein there are at least two groups and the respective analog databus and signaling line for each group are fed to corresponding inputs of a respective de-randomizer channel having respective outputs fed to an analog multiplexer so as to allow respective signals relating to each group to be processed before releasing the respective signaling line.

11. The detector according to claim 10, wherein the analog multiplexer has a single output and the analog multiplexer is configured to convey the corresponding inputs cyclically to the computer via an analog-to-digital converter.

12. The detector according to claim 10, wherein the analog multiplexer is configured to convey the corresponding outputs of each de-randomizer channel cyclically to the computer via an analog-to-digital converter.

13. A detector system comprising a detector having a 2-dimensional matrix of pixels including at least one group of pixels for detecting and measuring energy of individual photons striking pixels in said matrix, the detector system further comprising a processing circuit for processing analog signals generated in respect of photons striking the pixels;

the detector further comprising for each group:
   a respective electronic circuit coupled to each pixel in the group, each electronic circuit being responsive to an individual photon striking the pixel for generating in respect of each of said photons a respective local trigger and for generating and storing in respect of each of said photons a respective analog signal level of the pixel whose value is a function of an energy of the respective photon,
an analog databus that is common to all pixels in the group and which feeds each of said analog signals on a per-individual-photon basis, to an external processing circuit for processing the analog signals,
a common signaling line coupled to all pixels in the group for conveying to the respective electronic circuit a signal indicating that the databus is available to convey the respective analog signal level of the corresponding pixel, and
each of the electronic circuits in the group including logic responsive to the local trigger and to the signaling line being available, for indicating to the other electronic circuits in the group that the databus is unavailable; and
each of the electronic circuits including a respective timer that is configured to set a preset duration for usage of the databus to feed the analog signal level to the external processing circuit and for thereafter freeing the signaling line and resetting the respective electronic circuit; and
the processing circuit including:
a synchronous circuit, and
a de-randomizing circuit to which the synchronous circuit and the electronic circuits are coupled and which synchronizes pixel data fed randomly to the databus to the synchronous circuit.

14. The detector system according to claim 13, wherein the synchronous circuit includes an analog-to-digital converter (ADC) controlled by a ADC clock and the de-randomizing circuit includes a respective de-randomizer channel for each group that retains the analog pixel data on the respective analog databus for sufficient time to enable its peak value to be converted to a digital signal by the ADC for subsequent digital processing.

15. The detector system according to claim 14, wherein each pixel pushes its respective pixel data out within a preset fixed duration while flagging the respective signaling line as busy, and the de-randomizer channel is configured to receive and store the pixel data while also holding the signaling line in a busy state until the pixel data, now locally stored in the de-randomizer channel, is synchronized with the ADC clock.

16. The detector system according to claim 15, wherein there are at least two groups and the respective analog databus and signaling line for each group are fed to corresponding inputs of a respective de-randomizer channel in the processing circuit, each de-randomizer channel having respective outputs fed to an analog multiplexer so as to allow respective signals relating to each group to be processed before releasing the respective signaling line.

17. The detector system according to claim 16, wherein the analog multiplexer has a single output and the analog multiplexer is configured to convey the corresponding inputs cyclically to the computer via an analog-to-digital converter.

18. The detector system according to claim 17, wherein the analog multiplexer is configured to convey the corresponding outputs of each de-randomizer channel cyclically to the computer via an analog-to-digital converter.

19. A method for accumulating data relating to photons striking a detector having a 2-dimensional matrix of pixels, said matrix including at least one group of pixels, said method comprising for each pixel in any one of said groups:
   coupling to each pixel in the group a respective electronic circuit that is responsive to an individual photon striking the pixel for generating a respective local trigger and an analog signal level whose value is a function of an energy of the photon;
   determining whether the value of the analog pixel level signal exceeds a minimum threshold indicative of the signal being eligible to be acquired;
   if the signal is eligible to be acquired, sampling and storing a peak value of the pixel level signal after a specified time delay;
   monitoring a signaling line for receipt of an availability signal indicating that an analog databus that is common to all the pixels in the group is available for conveying data;
   upon receiving an availability signal, locking the databus for a preset time and conveying the analog pixel level signal along the analog databus to a processing circuit for processing respective analog pixel level signals generated by pixels in the sensor; and
   resetting the pixel after said preset time when transfer of the analog pixel level signal is completed and releasing the signaling line, thus allowing for other pixels in the group to use the databus.

20. The method according to claim 19, further including conveying together with the first analog signal an analog pixel address signal that uniquely identifies the pixel.

* * * * *